US008214584B2

(12) United States Patent
Johnson

(10) Patent No.: US 8,214,584 B2
(45) Date of Patent: Jul. 3, 2012

(54) SECURE VIRTUAL TAPE MANAGEMENT SYSTEM WITH EARLY READ SUPPORT OPTIONS

(76) Inventor: R. Brent Johnson, Zurich (CH)

( * ) Notice: Subject to any disclaimer, the term of this patent is extended or adjusted under 35 U.S.C. 154(b) by 415 days.

(21) Appl. No.: 12/548,568

(22) Filed: Aug. 27, 2009

(65) Prior Publication Data
US 2010/0058465 A1 Mar. 4, 2010

Related U.S. Application Data

(60) Provisional application No. 61/093,041, filed on Aug. 29, 2008.

(51) Int. Cl.
G06F 12/00 (2006.01)
(52) U.S. Cl. .......... 711/111; 726/4; 726/21; 711/4; 711/161; 711/167; 711/168; 707/610; 707/613; 707/617; 707/740
(58) Field of Classification Search .............. None
See application file for complete search history.

(56) References Cited

U.S. PATENT DOCUMENTS

| 5,592,657 | A | 1/1997 | Johnson et al. |
|---|---|---|---|
| 5,970,149 | A | 10/1999 | Johnson |
| 6,041,329 | A | 3/2000 | Kishi |
| 6,275,855 | B1 | 8/2001 | Johnson |
| 6,499,108 | B1 | 12/2002 | Johnson |
| 6,578,146 | B2 | 6/2003 | Johnson |
| 6,748,430 | B1 | 6/2004 | Johnson |
| 7,080,260 | B2 | 7/2006 | Johnson |
| 7,120,675 | B1 * | 10/2006 | Shupak et al. ............... 709/217 |
| 7,159,239 | B2 | 1/2007 | Johnson |
| 7,167,844 | B1 | 1/2007 | Leong et al. |
| 7,293,179 | B2 | 11/2007 | Johnson |
| 7,475,253 | B2 | 1/2009 | Johnson |
| 7,536,596 | B2 | 5/2009 | Johnson |
| 7,774,470 | B1 | 8/2010 | Sanders et al. |
| 7,779,416 | B2 | 8/2010 | Koga et al. |
| 7,877,511 | B1 | 1/2011 | Berger et al. |
| 7,987,265 | B2 | 7/2011 | Fukuzawa et al. |
| 2004/0006702 | A1 | 1/2004 | Johnson |

(Continued)

OTHER PUBLICATIONS

Ashton et al., "Two Decades of Policy-Based Storage Management for the IBM Mainframe Computer", 2003, IBM Systems Journal, vol. 42, No. 2.

Primary Examiner — Jung Kim
Assistant Examiner — Adrian Stoica
(74) Attorney, Agent, or Firm — Head, Johnson & Kachigian P.C.

(57) ABSTRACT

A secure virtual tape management system with early read support options. The system includes at least two mainframe hosts having a catalog storing tape related information. A primary virtual tape emulation system includes an adaptor and includes software for facilitating remote configuration and utilization of the virtual tape management. A virtual tape system catalog storing tape related information is attached to the virtual tape management. Remote data storage devices may be in communication with the virtual tape management central processing unit. Software resident on the catalog monitors tape related information on the primary virtual tape emulation system for criteria matching a virtual tape to be made available to a secondary host and initiates immediate transfer of that data allowing it to be read in a paced manner by the secondary host before the primary host has completed its series of tape writes.

13 Claims, 1 Drawing Sheet

U.S. PATENT DOCUMENTS

| | | |
|---|---|---|
| 2004/0073831 A1 | 4/2004 | Yanai et al. |
| 2007/0038887 A1* | 2/2007 | Witte et al. ............ 714/6 |
| 2007/0157294 A1* | 7/2007 | Johnson ............ 726/4 |
| 2008/0010324 A1* | 1/2008 | Stebner et al. ............ 707/204 |
| 2008/0281908 A1* | 11/2008 | McCanne et al. ............ 709/203 |
| 2010/0057790 A1 | 3/2010 | Johnson |
| 2010/0057844 A1 | 3/2010 | Johnson |

* cited by examiner

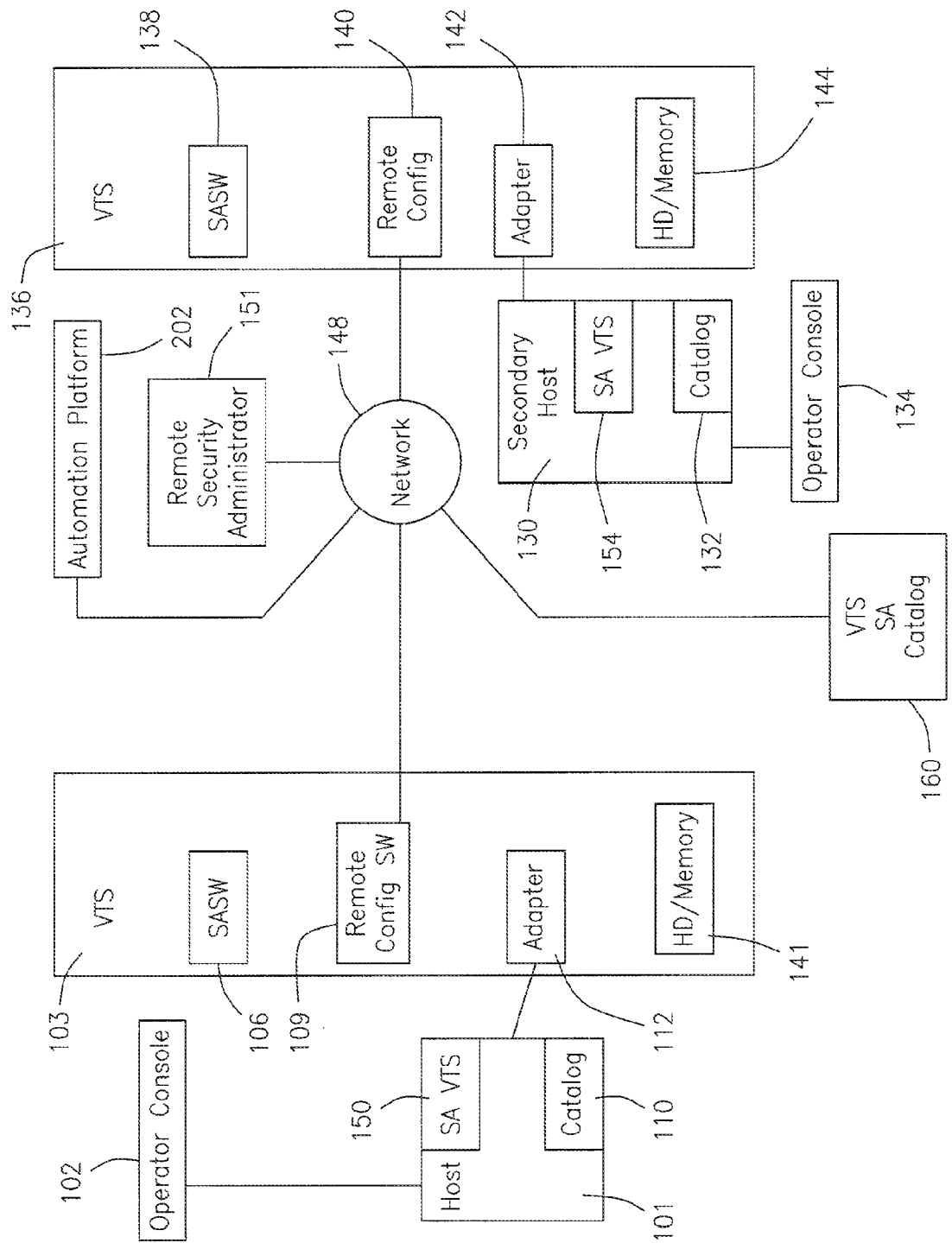

SECURE VIRTUAL TAPE MANAGEMENT SYSTEM WITH EARLY READ SUPPORT OPTIONS

CROSS-REFERENCE TO RELATED APPLICATIONS

This application claims priority to U.S. Provisional Application No. 61/093,041, filed Aug. 29, 2008, which is herein incorporated by reference.

BACKGROUND OF THE INVENTION

1. Field of the Invention

The present invention is directed to a secure virtual tape management system with early read options. In particular, the present invention is directed to a secure virtual tape management system capable of allowing host systems to read data from a virtual tape almost immediately after the process of writing the virtual tape has been initiated and before writing of the virtual tape has been completed. Additionally, the present invention affords the ability for multiple hosts to simultaneously and independently read the tape's data, each at its own pace.

2. Prior Art

It is necessary to store and backup data for many mainframe computer installations primarily for the purpose of safekeeping critical information in the event of an unexpected loss of the primary copy. The backups are often remotely stored offsite from the location of the mainframe installation.

At one time, ten inch, round reel tape drives were utilized on mainframe installations. The well known tape itself consists of a thin plastic base material with a coating of ferromagnetic ferric oxide powder. The round reel tapes were physically transported to an offsite location. Periodically, the tapes would be returned and then reused.

In the 1980's, cartridge tape units replaced the round reel tape drives. The tape cartridge system had fewer moving parts and was less prone to failure. Additionally, the tape cartridge system occupies a smaller floor footprint and consumed less power than the round reel drives. Additionally, the media itself was improved over time. Denser recording techniques allowed the cartridges to be smaller, yet hold the same amount of data. To improve cataloging and indexing functions, and facilitate data accessibility, typically one data set is placed on one tape volume. Some tape data sets span multiple volumes while others occupy less than a single volume. This can result in a significant waste of tape as most data sets occupy only a small portion of the media and the rest of the volume remains unused. Estimates are that industry norms are for tape cartridges to be less than 50% utilized. With a cartridge tape system, the same procedures for physically pulling certain cartridges and moving them to an offsite location would be performed.

More recently, virtual tape servers have been introduced which place a controller between a mainframe and the cartridge tape devices and attach a disk cache area from and to which data can be read and written. The controller handles the migration of data between the disk cache and the tape media in an optimal space and time fashion. The data is actually being read from and to disks. The disks are typically faster than tape devices.

Information regarding tape volumes is stored in a tape catalog, maintained by a tape management system running on the host mainframe. The tape management system associates a particular tape using its primary identifier, the tape's volume serial number, with the data sets stored onto it along with its retention, or expiration date. In order to manage the re-use of tapes, the retention date indicates when the data on a tape is no longer required and at such point in time, the tape may have its data overwritten or "scratched" out. Scratch tape is a common mainframe term for a tape available to be written upon, regardless of its prior contents if any.

A scratch list is a report that is generally prepared on a daily basis that includes all of the volume serial numbers whose retention date expired on that day. A human typically refers to this report while walking through a tape library, pulling those tapes on the report so that they may be placed into the scratch pool for reuse. The tape management system imposes a safe guard against non-expired tapes being mounted in place of a scratch tape by comparing the tape's volume serial number against its catalog expiration date. This volume serial number, in addition to being hand written onto the exterior of the tape, is on the beginning of the tape prior to the start of data set information in a section known as a "header". When a scratch tape is mounted for writing, the tape management system inspects the tape catalog to verify that the tape is truly a scratch. If not, then it is rejected and a different scratch tape requested.

A vault list is a report prepared at some particular time interval that includes all of the volume serial numbers that are to be removed from the tape library and physically taken offsite. Mainframe data centers have the need to move or copy data to off site locations, primarily for the purpose of safe keeping critical information to be used in the event of an unexpected loss of the primary copy of that information. This typically involves physical transportation of the mainframe tapes, an error prone process in that sometimes all the required tapes are not sent or sometimes a tape sent in error that is later required to be retrieved in order to complete the processing of a mainframe job. Further, the data on these tapes is typically un-encrypted and therefore vulnerable to anyone being able to read it.

The tape management system is primarily used to cross-reference the location of a desired data set to a tape volume serial number. It is secondarily used to manage scratch lists and vault lists.

The present invention is supported via an encrypted communications protocol interfacing with, and relying upon, the teachings, practices and claims disclosed in U.S. Pat. No. 6,499,108 (hereinafter synonymously referred to as "Secure Agent®" or "SA"), which is incorporated herein by reference.

Secure Agent Overview

The following overview is provided to facilitate a comprehensive understanding of the teachings of the instant invention. Secure Agent® utilizes a secure login sequence wherein a client connects to a Secure Agent server using a key known to both systems and a client connects and presents the server with user identification (as used herein the term "client" refers synonymously to a remote user or component establishing, and communicating with the instant invention through Secure Agent allocation and encryption processes as taught in the above noted applications). If recognized, the Secure Agent server initiates a protocol whereby the client's identification is verified and subsequent communication is conducted within a secured (encrypted) construct. For purposes of this overview, the term "server" should be considered a hardware configuration represented as a central processing unit wherein Secure Agent, a Host DLL and driver reside, and are executed. The term "DLL" as used herein refers to a Secure Agent host dynamically linked library (a.k.a. Host DLL). The term "DLL" or "dynamically linked library" is used in a manner consistent with that known to those skilled in the art. Specifically, the term "DLL" refers to a library of executable functions or data that can be used by a Windows™ or LINUX application. As such, the instant invention provides for one or more particular functions and program access to such functions by creating a static or dynamic link to the DLL of reference, with "static links" remaining constant during program execution and "dynamic links" created by the program as needed.

The Secure Agent® server presents a variable unit of data, such as the time of day, to the client as a challenge. The client must then encrypt that data and supply it back to the server. If the server is able to decrypt the data using the stored client's key so that the result matches the original unencrypted challenge data, the user is considered authenticated and the connection continue. The key is never passed between the two systems and is therefore never at risk of exposure.

The initial variable unit of data seeds the transmission of subsequent data so that the traffic for each client server session is unique. Further, each byte of data transmitted is influenced by the values of previously sent data. Therefore, the connection is secure across any communication passageway including public networks such as, but not limited to, the Internet. The distance between the client and server is not of consequence but is typically a remote connection. For accountability purposes, the actions of a client may be recorded (logged) to non-volatile storage at almost any detail level desired.

The access rights of each client (what the client is able to accomplish during a session) is governed by data stored on the Secure Agent® server to which the client is associated. As an example, such rights might encompass the ability to administer and utilize the services of the server system, which would, in turn, include capabilities such as adding new clients or components, changing a user's rights, transferring new code to the server, using a feature (or service) of the server and more.

Consequently, Secure Agent® allows for the transmission of new code to the server and for that code to be implemented upon demand by a client. Such dynamic, real-time implementation in turn, allows for the behavior of the server to be modified. It is to this behavior modification the instant invention addresses its teachings, and thereby advances the contemporary art.

As will be readily appreciated by those skilled in the art, though the instant invention utilizes encryption/decryption and code recognition technology associated with Secure Agent®, alternative technologies may be employed in support of the instant invention without departing from the disclosure, teachings and claims presented herein.

Virtual Tape Catalog

A virtual tape catalog described in the present invention is a database repository of tape related information regarding each virtual tape used by the tape emulator. It is used to manage the disposition of tapes and is therefore much like a mainframe's internal tape catalog. The virtual tape catalog is crucial to the operation of the system and is therefore replicated to one or more remote locations. Along with the primary data element used to identify a specific virtual tape, the volume serial number, it indicates the information necessary to manage it such as:

Expiration date.
Scratch indicator.
Indicator that it should always be copied to remote data storage.
Indicator that it is ready to be copied to remote data storage.
The remote data storage target to which it should be copied.
Indicator that the source tape file should be deleted after being copied to remote data storage (a move operation).
Indicator that it should always be copied to an archiver.
Indicator that it is ready to be copied to an archiver.
The archiver target to which it should be copied.
Indicator that the source tape file should be deleted after being copied to an archiver (a move operation).
The host processor dataset names that it contains.
The size of the tape file.
The date and time when it was created.
The date and time when it was last accessed.
The current locations of the tape file.
The date and time that it was transmitted to its current locations.
An indicator that it is currently in use.
The security groups to which it belongs.
Indicator that the tape file should be automatically retrieved upon a mount request if it happens to have been moved off the tape emulator component.
Indicates that it should be recovered to the tape emulator component.
Indicates it should be encrypted when created.
Encrypted indicator.

In addition to information specific to each tape, additional information is stored within the virtual tape catalog such as global configuration information and rules that govern the disposition of tapes. These include:

The central key phrase (password) used to encrypt the virtual tape images.
Certain dataset name patterns that, when encountered during the creation of a tape, cause a tape to be reassigned into specific security groups.
Periods of time that, when compared against when a tape is to be expired during the creation of a tape, cause a tape to be copied to remote data storage.
Periods of time that, when compared against when a tape is to be expired during the creation of a tape, cause a tape to be copied to an archiver.
Periods of time that, if a tape goes unaccessed by the host processor, that it will be moved to remote data storage.
Periods of time that, if a tape goes unaccessed by the host processor, that it will be moved to the archiver.

The invention's mainframe host information component provides tape catalog and tape mount information from the host processor by way of one of the tape emulator component's devices. The specific device may be any device type best suited for the facilities available to the host information component. Non-limiting examples include 3480, through special commands or sequences; 3286 printer emulation; or 3270 display emulation. Based on a unique communication sequence initiated by the host information component, this particular emulated device is able to recognize that it services the 'control path' and reacts accordingly.

The 'control path' between the mainframe host information component and the remainder of elements of the system is used to supply all information required from the mainframe host such as tapes to be scratched, tapes to be transmitted to vault, tape mount requests and tape retrieval (or recall) requests. The information relating to tape scratches, tape vaulting and tape retrieval is collected periodically by the host information component from the host processor's tape catalog. The information relating to tape mount requests is collected as they occur, either by intercepting an operator message or by otherwise hooking into a host processor's tape mount user exit, a method by which a utility may gain useful information. For a tape to be scratched, vaulted or recalled, the device correspondingly updates the virtual tape catalog.

For a tape to be mounted, the device relays the mount request to the emulated tape drive indicated in the request, parsing the request as necessary per the host processor's tape mount request message format. If, for whatever reason, the tape mount cannot be satisfied, a message is sent up through the control path to the host information component in order that an operator message may be issued indicating the reason for being unable to service the request.

It is occasionally necessary for a secondary host system to read a tape produced by a primary host system as soon as possible, with perhaps time-critical processing by the secondary host system being delayed until it is able to process the primary host's tape. This has historically required that the first host processor complete writing the entirety of the necessary data to tape, unload the tape, have the tape manually transported to the secondary host's location then be mounted on one of the secondary host's tape drives. Often, by design, there is some distance between the two systems causing further time delay during transportation. Even in the case with existing emulated tape systems, the data on the first tape must be completed prior to initiating the reading of the tape by a secondary system.

Accordingly, it is a principal object and purpose of the present invention to provide a secure virtual tape management system capable of allowing the sharing of a virtual tape to one or more secondary hosts almost immediately after the process of writing the virtual tape has been initiated by the primary host, well before the writing of the first tape has been completed.

BRIEF DESCRIPTION OF THE DRAWINGS

FIG. 1 is a simplified schematic diagram of a secure virtual tape management system with early read support options in accordance with the present invention.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, FIG. 1 illustrates a simplified schematic diagram providing a conceptual overview of the primary hardware and software components of the present invention in a preferred embodiment. A mainframe host computer 101 may execute various operating systems such as MVS, VM, VSE, LINUX or UNIX. The mainframe host computer 101 may also include an inboard tape catalog 110. Additionally, the mainframe host 101 includes an operator console 102 communicably attached thereto.

Each mainframe computer host typically will be connected to at least one console, including a keyboard and display terminal, for operations personnel to monitor and control the operation of the system. The operations staff interface with the mainframe host computer 101 through the operator console 102. This console displays status messages about the computer system and allows the operations staff to control the operations of the mainframe host computer. For example, a job on the mainframe host may require data from a tape or from a virtual tape, such job being a software program running within the mainframe such as a scheduled task or task started on demand. The job will send a message to the console operator. The operator will then mount the requested tape and inform the mainframe host computer that it is available by making an entry at the console. Other types of messages include errors or critical situations occurring on the mainframe host computer. It is the console operator's job to monitor the mainframe host system through the console messages and note any problems that may occur.

The present invention includes a virtual tape system tape emulator ("VTS") 103 which has Secure Agent® software 106 executing under its control program. The VTS server 103 also has operating under control of its control program remote configuration software 109. Also embodied within the VTS server 103 is a hardware adaptor card 112. The adaptor card 112 is, in turn, communicably attached to one or more mainframe host processors, such as mainframe host processor 101. As used herein, the term "adaptor" refers synonymously to those hardware configurations such as, but not limited to, "adaptor cards" which allow for connectability between two or more central processing units and the transference of data associated therewith. Illustrative non-limiting examples of such adaptors as used herein would include various ESCON adaptors, parallel channel adaptors, FICON adaptors and SCSI adaptors.

The VTS server 103 also includes a hard drive or multiple hard drives with a memory or multiple memories 141.

The virtual tape system emulator component 103 conceptually consists of lower level and higher level layers. The lower layer may be a device driver communicating directly with one or more hardware adaptors attached to one or more computer systems, such as, but not limited to, mainframe computers (a.k.a. host processors). Illustrative non-limiting examples of such adaptors as used herein would include various ESCON adaptors, parallel channel adaptors, FICON adaptors, and SCSI adaptors. From the host processor's perspective, the tape drive emulator's virtual drives are indistinguishable from real tape drives as it pertains to normal operations.

The driver controls the hardware in a manner prescribed by its design, causing it to interact with the other host processor computer systems to which it is connected as if it were one or more device types (emulation). The driver acts as a conduit to the higher layer that governs the overall behavior of the emulated devices.

The higher layer primarily supplies the driver with new data to provide through the emulated devices to the other computers to which it is connected and accepts data arriving to the emulated devices carried up by the driver. The higher layer manages the information repository against which the driver operates. Using the example of a 3480 tape drive, the higher layer's information repository represents a virtual tape. Mainframe reads and writes are serviced using the contents of this virtual tape. The virtual tape files reside on RAID disk drives, encrypted using a central key phrase specified by a security administrator, as will be explained in detail. Therefore, the data stored onto the RAID devices is not useful when accessed outside of the present process, thereby increasing data security.

Each instance of an emulated device is associated with unique security group information which, when compared against the security group contained within the virtual tape catalog for each tape, controls which tapes may be loaded on it. This security group comparison is performed upon receiving a tape mount request from the host information component. Additionally, if the tape requested is for a 'scratch', then such a tape is requested from the virtual tape catalog.

If a tape is not locally available, because it has been moved off of the tape emulator component by either the remote data storage or archiver components, then the mount may not be immediately satisfied. In this event, a notification is made to the host information component. If the virtual tape catalog indicates that it should be automatically recalled then it will be updated to indicate such a recall should be performed; a priority event for the remote data storage component. In such an event the emulated device periodically inspects the virtual tape catalog to determine whether the tape has been recalled, continuing once it has.

Once an appropriate tape is locally available, exclusive access is ensured by comparing then setting its in use indicator within the virtual tape catalog. The virtual tape is then used as the emulated device's data repository. Upon being written, the virtual tape catalog is updated with the fact that it has been updated. As the contents of a virtual tape are updated by the host processor, relevant information is updated in the virtual tape catalog.

By default, a virtual tape that has been freshly written or created will receive the security groups of the device that created it. However, the administrative tool may be used to indicate certain dataset name characteristics that may be used to redirect the virtual tape into different security groups. Additionally, any other administration policies, such as might be applied based on the dataset names or expiration date, are applied.

When the tape is dismounted, the last access date is updated in the catalog. It is then marked as no longer being in use within the virtual tape catalog, allowing the remote data storage and archiver components the ability to act upon it as necessary.

A remote data storage component is primarily responsible for collecting a virtual tape image from the virtual tape emulator. The remote data storage component, when idle, periodically requests tape movement criteria from the virtual tape catalog, prioritizing 'recall' requests for virtual tapes to be recovered from the remote data storage to the tape emulator.

Remote data storage might be implemented in more than a single manner. First, the storage might be a unit capable only of receiving, storing and recalling virtual tape images to serve the purpose of an offsite vault for disaster recovery purposes. Second, the storage might be that owned by a second instance of the virtual tape system 136. In this case the second VTS would be connected to a secondary host system 130.

Like each emulated tape device and each virtual tape, the remote data storage component is assigned to one or more security groups controlling which tapes it is able to transfer from the tape emulator. If a candidate tape doesn't have a matching security group then it is not considered for transfer and ignored.

Prior to a transfer, it ensures dedicated access by comparing then setting the virtual tape's in use indicator within the virtual tape catalog. The virtual tape is then copied as per the virtual tape catalog. After the tape has been copied the virtual tape catalog is updated to reflect the virtual tape's locations and time it was copied. Additionally, if the operation was not a recall and was a "move" rather than a "copy", it is then deleted off of the tape emulator. Finally, the virtual tape's in use indicator is cleared in the virtual tape catalog.

Also shown on FIG. 1 is a secondary host mainframe 130 which includes an inboard tape catalog 132 similar in design and configuration to the inboard catalog 110. The secondary host mainframe 130 may also include a software component that is installed and executes upon, or inboard, the secondary host mainframe 130. Additionally, the secondary host mainframe 130 includes an operator console 134 communicably attached thereto.

A secondary virtual tape system 136 which has Secure Agent® software 138 executing thereon includes remote configuration software 140. The remote configuration software 140 permits communication with a network 148, such as the Internet, in order to communicate with other elements of the system.

An adaptor card 142 in the secondary virtual tape system 136 communicates with the secondary host mainframe 130. The VTS 136 also includes a hard drive or multiple hard drives with a memory or multiple memories 144.

A virtual tape system (VTS) catalog 160 is an independent repository of tape related information maintained on a secure name server that is used by the VTS 103 to manage disposition of its tapes and is similar to the mainframe host tape catalog 110. Information from the mainframe tape catalog 110 is periodically provided to the VTS 103 so that it might update the VTS catalog 160. Each time a tape image is moved to archive, that information is placed in the VTS catalog 160.

The VTS catalog 160 may be connected to the VTS through a network, such as the Internet 148. The present invention also includes an inboard software component 150 that is installed and executes upon or inboard, the mainframe host computer 101. This inboard software component 150 transmits information to the virtual tape system catalog 160 accomplished by allocating one of the VTS's emulated devices and communicating through it in order to transfer such things as the scratch list and vault list, each of which are retrieved from the mainframe's tape catalog.

Additionally, tape mount messages that indicate the tape volume serial number to be mounted upon a particular drive are also transferred through this interface. The interface may be accomplished through either of two means. First, it may be implemented by way of unique commands to a VTS emulated tape drive 103 otherwise unused during the normal course of tape operations. When these unique commands are received, they are inspected for validity and the contents retrieved. Second, it may be implemented by way of normal transfer of data to another emulated device type such as a 3286 printer or a 3270 display. These latter approaches require that the normal device data streams be parsed as necessary in order to extract the desired information from them.

The receipt of a tape scratch list causes the VTS catalog 160 to be updated to reflect which tapes are now considered scratch candidates while the receipt of a vault list causes the VTS catalog 160 to be updated to reflect which tapes are to be transmitted to an off-site data storage component.

A remote security administrator central processing unit 151 interactively communicates and connects with other elements of the system through a network, such as the Internet 148. In particular, the remote security administrator 151 communicates with the Secure Agent® software 106 operating within the VTS 103. The remote security administrator 151 administers and maintains users/resource profiles and further communicates with information conveyed to the Secure Agent software 106 via software processes associated with the remote configuration software 109. The remote security administrator 151 controls the configuration of one or more VTS devices and also controls access to remote off-site backup devices to be described.

The present invention provides for early read support whereby data being written or copied to tape by a primary host 101 may be read or utilized almost immediately by a secondary host 130 significantly prior to the primary host 101 completing its use of the tape.

The catalog component 160 monitors all tape mounts and other activities including tape position, volume serial number, group of tapes, and other information. When a particular volume serial number, group of tapes, or data set name match is detected by the catalog 160, the early reading process is triggered whereby the tape file being written by the primary host 101 is immediately made available to the secondary host 130. Early reading may be accomplished in two ways. First, if common storage is shared between the two systems then the virtual tape data is immediately accessible to the secondary virtual tape system 136. Second, if common storage is not shared between the two systems, then the catalog 160 initiates communication between the primary virtual tape system 103 and the secondary virtual tape system 136 to copy the tape data as it is being written.

Once the data begins to become available communication is initiated from the catalog 160 to the secondary virtual tape system 136 and notification is sent by way of an interface such as adaptor 142 to the inboard host component 154 on the secondary host 130. The inboard host component 154 updated catalog 132 thereby making secondary host 130 aware of the availability of the tape being written by the primary host 101.

Buffering is provided and reads by the secondary host 130 are satisfied as data is written by the primary host 103. Pacing by the secondary virtual tape system 136 limits the secondary host 130 from reading as fast as primary host 101 is writing data. Accordingly, a second instance of the virtual tape may be accessed in a read-only manner by a secondary host 130 as it is being written by primary host 101.

It is a further object and purpose of the present invention to provide a system wherein such sharing of virtual tape data may be simultaneously performed for potentially many secondary hosts. It is intended that if more than one secondary host exists then early read service of the virtual tape data will be provided as desired for each and every such secondary host. Such service would be independent where a slow transmission link or slow secondary host access of the virtual tape would have no negative impact on another secondary host. In short, they are independently paced based on their individual transfer, buffering and processing capabilities.

Whereas, the present invention has been described in relation to the drawings attached hereto, it should be understood that other and further modifications, apart from those shown or suggested herein, may be made within the spirit and scope of this invention.

What is claimed is:

1. A system to facilitate secure virtual tape management with early read support options, which system comprises:
    at least one mainframe host processor central processing unit having a catalog storing tape related information and having an operator console communicably attached thereto;
    a primary virtual tape management central processing unit having an adaptor for communicating with said mainframe host processor and having software for facilitating remote configuration and utilization of said virtual tape management central processing unit;
    a virtual tape system catalog storing tape related information, said virtual tape catalog system being updated on creation of a tape image, on movement of a tape image, or on instruction from a remote security administrator central processing unit, wherein said virtual tape system catalog is communicably attached to said primary virtual tape management central processing unit;
    one or more remote data storage devices in communication with said virtual tape management central processing unit;
    at least one secondary mainframe host central processing unit having a catalog storing tape related information and having an operator console communicably attached thereto;
    a secondary virtual tape management central processing unit having an adaptor for communicating with said secondary mainframe host and having software for facilitating remote configuration and utilization of said secondary virtual tape management central processing unit; and
    software resident on said virtual tape system catalog to monitor said tape related information on said primary virtual tape management central processing unit for a data set or volume serial number match and to initiate communication and reading of data from said one or more remote data storage devices by said secondary virtual tape management central processing unit, where such initiation of communication occurs immediately upon detecting said data set or volume serial number match and prior to the mainframe host processor central processing unit completing its use of the primary virtual tape management central processing unit.

2. A system as set forth in claim 1 wherein said tape related information includes tape position, volume serial number, and group of tapes.

3. A system as set forth in claim 1 including a secondary virtual tape system catalog communicably attached to said secondary virtual tape management central processing unit.

4. A system as set forth in claim 1 wherein said secondary virtual tape management central processing unit notifies said at least one secondary mainframe host of availability of said data at the time of said initiation and communication and reading of said data.

5. A system as set forth in claim 1 wherein access to said data by said at least one secondary mainframe host central processing unit is paced by said secondary virtual tape management central processing unit to not exceed the speed of production of said data and associated transfer speeds by said at least one mainframe host central processing unit and by said primary virtual tape management central processing unit.

6. A system as set forth in claim 1 wherein said at least one secondary mainframe host central processing unit includes a plurality of secondary mainframe host central processing units and wherein said plurality of secondary mainframe host central processing units each may simultaneously access said data.

7. A system to facilitate secure virtual tape management with early read support options, which system comprises:
    at least one mainframe host processor central processing unit having a catalog storing tape related information and having an operator console communicably attached thereto;
    a primary virtual tape management central processing unit having an adaptor for communicating with said mainframe host processor and having software for facilitating remote configuration and utilization of said virtual tape management central processing unit;
    a virtual tape system catalog storing tape related information, said virtual tape catalog system being updated on creation of a tape image, on movement of a tape image, or on instruction from a remote security administrator central processing unit, wherein said virtual tape system catalog is communicably attached to said primary virtual tape management central processing unit;
one or more remote data storage devices in communication with said virtual tape management central processing unit;
at least one secondary mainframe host central processing unit having a catalog storing tape related information and having an operator console communicably attached thereto;
a secondary virtual tape management central processing unit having an adaptor for communicating with said secondary mainframe host and having software for facilitating remote configuration and utilization of said secondary virtual tape management central processing unit; and
software resident on said virtual tape system catalog to monitor said tape related information on said primary virtual tape management central processing unit for a data set or volume serial number match and to initiate communication between said secondary virtual tape management and said primary virtual tape management central processing unit, where such initiation of communication occurs immediately upon detecting said data set or volume serial number match and prior to the mainframe host processor central processing unit completing its use of the primary virtual tape management central processing unit.

8. A system as set forth in claim 7 wherein said tape related information includes tape position, volume serial number, and group of tapes.

9. A system as set forth in claim 7 including means to transfer of tape images from said primary virtual tape management central processing unit to said secondary virtual tape management central processing unit.

10. A system as set, forth in claim 7 including a secondary virtual tape system catalog communicably attached to said secondary virtual tape management central processing unit.

11. A system as set forth in claim 7 wherein said secondary virtual tape management central processing unit notifies said at least one secondary mainframe host of availability of said data at the time of said initiation and communication and reading of said data.

12. A system as set forth in claim 7 wherein access to said data by said at least one secondary mainframe host central processing unit is paced by said secondary virtual tape management central processing unit to not exceed the speed of production of said data and associated transfer speeds by said at least one mainframe host central processing unit and by said primary virtual tape management central processing unit.

13. A system as set forth in claim 7 wherein said at least one secondary mainframe host central processing unit includes a plurality of secondary mainframe host central processing units and wherein said plurality of secondary mainframe host central processing units each may simultaneously access said data.

* * * * *